United States Patent [19]

Fujiwara et al.

[11] Patent Number: 5,109,100
[45] Date of Patent: Apr. 28, 1992

[54] THERMOPLASTIC, LIQUID-CRYSTALLINE, WHOLLY AROMATIC POLYIMIDE ESTER AND METHOD OF PRODUCING THE SAME

[75] Inventors: Kenichi Fujiwara; Hideo Hayashi; Makoto Wakabayashi, all of Chiba, Japan

[73] Assignee: Idemitsu Petrochemical Co., Ltd., Tokyo, Japan

[21] Appl. No.: 443,253

[22] Filed: Nov. 30, 1989

[30] Foreign Application Priority Data

Nov. 30, 1988 [JP] Japan ................... 63-300616

[51] Int. Cl.$^5$ ........................... C08G 63/685
[52] U.S. Cl. ................... 528/170; 528/183; 528/184; 528/188
[58] Field of Search ............... 528/170, 188, 183, 184

[56] References Cited

U.S. PATENT DOCUMENTS 4,760,124 7/1988 Matsumura et al. ............ 528/170

*Primary Examiner*—Harold D. Anderson
*Attorney, Agent, or Firm*—Antonelli, Terry, Stout & Kraus

[57] ABSTRACT

A thermoplastic, liquid-crystalline, wholly aromatic polyimide ester comprising
(a) at least one structural unit derived from an aromatic dicarboxylic acid,
(b) at least one structural unit derived from a substituted hydroquinone having an aralykyl substituent group in its benzene nucleus, and at least one structural unit selected from (c) structural units derived from carboxy-N-(carboxyphenyl)phthalimides and (d) structural units derived from carboxy-N-(hydroxyphenyl)phthalimides is able to be molded by injection molding, has excellent dimensional stability and dimensional accuracy in both flow direction and a direction making a right angle with the flow direction, and is also excels in strength, elastic modulus, and heat resistance. The thermoplastic, liquid-crystalline, wholly aromatic polyimide ester may be suitably produced by using, as the reaction materials, an aromatic dicarboxylic acid, a substituted hydroquinone substituted by an aralkyl substituent group in its benzene nucleus, and both or one of a carboxy-N-(carboxyphenyl)phthalimide and a carboxy-N-(hydroxyphenyl)phthalimide, or their derivatives, and polycondensing these compounds.

17 Claims, 1 Drawing Sheet

THERMOPLASTIC, LIQUID-CRYSTALLINE, WHOLLY AROMATIC POLYIMIDE ESTER AND METHOD OF PRODUCING THE SAME

BACKGROUND OF THE INVENTION (a) Field of the Invention

The present invention relates to a thermoplastic, liquid-crystalline, wholly aromatic polyimide ester and a method of producing the same. Particularly, the present invention relates to a novel thermoplastic, liquid crystalline, wholly aromatic polyimide ester and a method of producing the same, which polyimide ester can be suitably used as engineering plastics for electric and electronic parts, automobile parts, etc. which require excellent dimensional stability and accuracy in both flow direction (machine direction: MD) and a direction making a right angle with the flow direction (transverse direction: TD), particularly in the field of precision injection-molded articles, or in the fields of film, sheet, textile industries or the like.

(b) Description of the Related Art

In recent years, thermoplastic resins having extremely small coefficients of linear expansion in MD have come to be known. These resins are a series of resins called thermotropic liquid-crystalline polymers, and some examples of such resins include the wholly aromatic polyesters disclosed in Japanese Patent Application Kokoku Koho (Publication) No. 63-3888, Japanese Patent Application Kokoku Koho (Publication) No. 58-40976, Japanese Patent Application Kohyo Koho No. 61-501207, Japanese Patent Application Kokai Koho (Laid-open) No. 58-29819, Japanese Patent Application Kokai Koho (Laid-open) No. 58-45224, Japanese Patent Application Kokai Koho (Laid-open) No. 59-30821, Japanese Patent Application Kokai Koho (Laid-open) No. 59-78232, Japanese Patent Application Kokai Koho (Laid-open) No. 64-26631, and Japanese Patent Application Kokai Koho (Laid-open) No. 64-40520.

The above-mentioned polyesters have small coefficients of linear expansion in MD but have much the same coefficients of linear expansion in TD as those of common thermoplastic resins, and are therefore hardly sufficient in dimensional stability.

Improvement of the dynamic properties in TD has been attempted, as disclosed in Japanese Patent Application Kokai Koho (Laid-open) No. 63-146959, generally by introducing into the polyesters inorganic fillers (such as glass fibers, calcium carbonate, etc.). However, no satisfactory results have been obtained from such an attempt.

Polyimide esters containing both imide bonds and ester bonds in their molecules have also been well known. For example, those exhibiting high heat resistance are disclosed in U.S. Pat. No. 3,542,731, those improved in heat resistance, mechanical properties, and processability in Japanese Patent Application Kokai Koho (Laid-open) No. 58-67725, those having high elastic moduluses in Japanese Patent Application Kokai Koho (Laid-open) No. 55-84326, those having toughness in Japanese Patent Application Kokai Koho (Laid-open) No. 58-113222, and those having high rigidity in Japanese Patent Application Kokai Koho (Laid-open) No. 60-4531. However, these polyimide esters are also hardly sufficient in the dimensional stability.

SUMMARY OF THE INVENTION

An object of the present invention is to provide a novel thermoplastic, liquid-crystalline, wholly aromatic polyimide ester and a method of producing the same, which polyimide ester is improved in dimensional stability and dimensional accuracy due to its small coefficients of linear expansion and the mold shrinkage in both MD and TD, and which polyimide ester, at the same time, preserves the excellent properties of thermotropic liquid-crystalline polymers including high heat resistance, strength, high elastic modulus, and high resistance to chemicals.

The inventors, as the results of their studies to solve the above-described problems, have found that the above objects can be attained by polyimide esters obtained by introducing certain imido groups into certain aromatic polyesters, and have eventually completed the present invention.

That is, the present invention provides a thermoplastic, liquid-crystalline, wholly aromatic polyimide ester comprising
(a) at least one structural unit derived from an aromatic dicarboxylic acid,
(b) at least one structural unit derived from a substituted hydroquinone having an aralkyl substituent group attached to the benzene nucleus, and at least one structural unit selected from the group consisting of (c) structural units derived from carboxy-N-(carboxyphenyl)phthalimides and (d) structural units derived from carboxy-N-(hydroxyphenyl)phthalimides.

The polyimide ester can be molded by injection molding, and it has not only excellent dimensional stability and dimensional accuracy in both MD and TD but also excellent strength, modulus of elasticity (toughness), and heat resistance, and therefore, can be suitably used as the materials for electric and electronic parts, automobile parts, and the like.

Another object of the invention is to provide a thermoplastic, liquid-crystalline, wholly aromatic polyimide ester and a method of producing the same, which polyimide ester not only has excellent dimensional stability and dimensional accuracy in both MD and TD in common with the above-described polyimide ester of the present invention, but also has an advantage in that it has a lower melting point than the above-described polyimide etc., which permits the use of a general purpose molding machine in molding.

The applicant disclosed in Japanese Patent Application No. 1-128756 a wholly aromatic copolyester having such a low melting point as to be suited for molding using a general purpose molding machine, which copolyester comprised a structural unit derived from an aromatic dicarboxylic acid, a structural unit derived from hydroquinone, and a structural unit derived from a substituted hydroquinone substituted by an aralkyl group attached to the benzene nucleus. Although the copolyester overcame the above-described difficulty in molding, it was encountered with the problems including warping, twisting, and residual distortion owing to the anisotropy in mold shrinkage, because in common with many other liquid-crystalline polyesters, although it had the features of a high strength, a high modulus of elasticity, and a low coefficient of linear expansion in MD, it has still about the same as the common thermoplastic resins in its properties in TD.

As the results of the study to solve these problems, the inventors have found that the object of the present invention can be accomplished by introducing a unit derived from hydroquinone in the above-described polyimide ester of the present invention.

That is, the present invention further provides a thermoplastic, liquid-crystalline, wholly aromatic polyimide ester comprising
(a) at least one structural unit derived from an aromatic dicarboxylic acid,
(e) a structural unit derived from hydroquinone,
(b) at least one structural unit derived from a substituted hydroquinone having an aralkyl substituent group attached to the benzene nucleus, and at least one structural unit selected from the group consisting of (c) structural units derived from carboxy-N-(carboxyphenyl)phthalimides and (d) structural units derived from carboxy-N-(hydroxyphenyl)phthalimides.

The polyimide ester, in common with the polyimide ester containing no unit derived from hydroquinone, has excellent dimensional stability and dimensional accuracy in both MD and TD, and also excels in its strength, modulus of elasticity, and heat resistance. Further, the polyimide ester has a lower melting point and does not need high temperature molding which may induce a thermal deterioration. Also, this polyimide ester is advantageous in that because there is no need for high temperature molding, the molding machine is not required to have a higher capacity of cylinder heater, which permits the use of general purpose molding machines.

DESCRIPTION OF THE PREFERRED EMBODIMENTS

Figure 1:
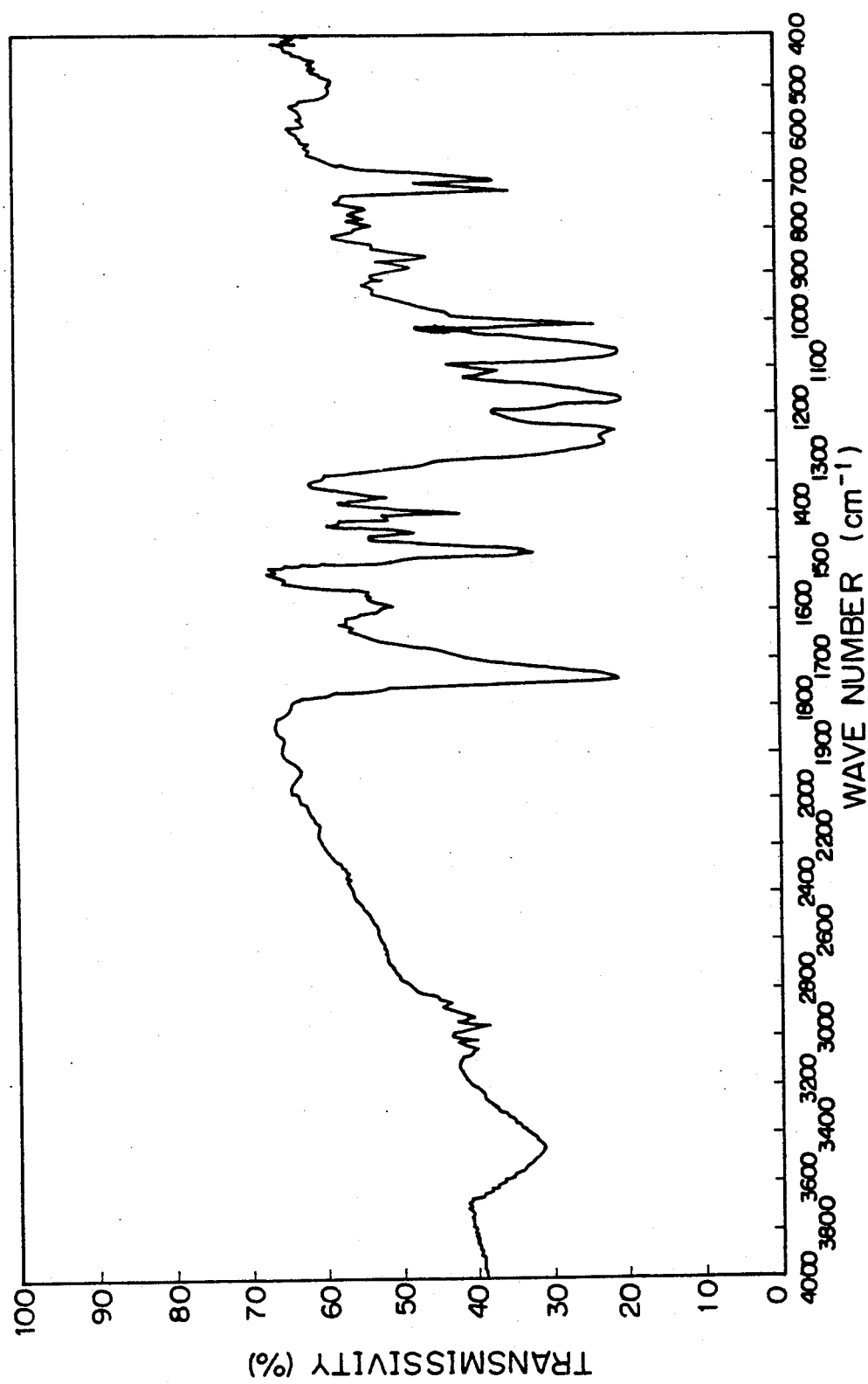
FIG. 1 is a chart showing the IR spectrum of the polyimide ester of the present invention obtained in Example 2.

In the thermoplastic, liquid-crystalline, wholly aromatic polyimide ester of the present invention which comprises
(a) at least one structural unit derived from an aromatic dicarboxylic acid,
(b) at least one structural unit derived from a substituted hydroquinone having an aralkyl substituent group attached to the benzene nucleus, and at least one structural unit selected from the group consisting of (c) structural units derived from carboxy-N-(carboxyphenyl)phthalimides and (d) structural units derived from carboxy-N-(hydroxyphenyl)phthalimides, the preferred, total molar fraction of (c) the structural units derived from carboxy-N-(carboxyphenyl)phthalimides and (d) the structural units derived from carboxy-N-(hydroxyphenyl)phthalimides is from 0.1 to 30 mol %, more preferably from 0.5 to 20 mol %. If the total molar fraction is less than 0.1 mol %, the effect in improving the dimensional stability and dimensional accuracy in MD and TD may sometimes become insufficient, and a total molar fraction of more than 30 mol % may sometimes result in an insufficient strength.

Among various embodiments of the wholly aromatic polyimide ester of the present invention comprising the structural units (a), (b), and (c) or (d) or the structural units (a), (b), (c), and (d), the thermoplastic, liquid-crystalline, wholly aromatic polyimide ester comprising the structural units I, II, and III represented by the following formulas respectively or the structural units I, II, and IV represented by the following formulas respectively can be produced by using relatively low-priced compounds as the raw materials.

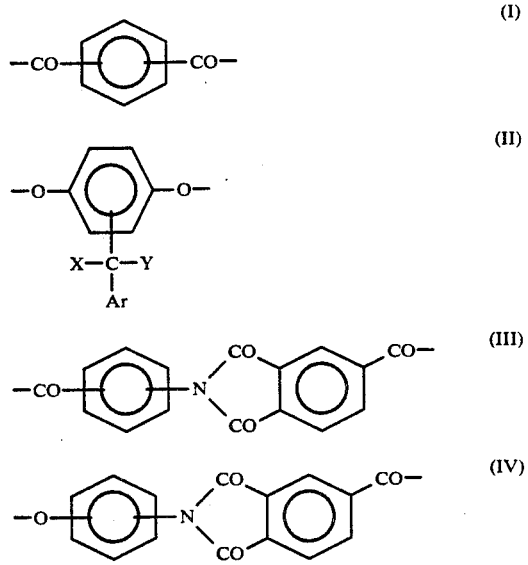

wherein
in the structural unit I, the two carbonyl groups are present at meta- or para-position to each other, the two carbonyl groups being present at para-position to each other in 90 mol % or more of the structural unit in the structural unit II, each of X and Y represents independently hydrogen or an alkyl group of 1 to 3 carbon atoms, Ar represents an aryl group of 6 to 12 carbon atoms, in the structural unit III, the carbonyl group at the left end and the imido group are present at para- or meta-position to each other, in the structural unit IV, the oxy group at the left end and the imido group are present at para- or meta-position to each other, and the structural units I, II, and III or the structural units I, II, and IV are bonded with one another at each end through ester bonds.

In the thermoplastic, liquid-crystalline, wholly aromatic polyimide ester of the present invention comprising
(a) at least one structural unit derived from an aromatic dicarboxylic acid,
(e) a structural unit derived from hydroquinone,
(b) at least one structural unit derived from a substituted hydroquinone having an aralkyl substituent group attached to the benzene nucleus, and at least one structural unit selected from the group consisting of (c) structural units derived from carboxy-N-(carboxyphenyl)phthalimides and (d) structural units derived from carboxy-N-(hydroxyphenyl)phthalimides, the preferred molar ratio of the (e) structural unit derived from hydroquinone to the (b) structural unit derived from a substituted hydroquinone having an aralkyl substituent group attached to the benzene nucleus, (e):(b), is from 0.5:49.5 to 30:20, more preferably from 2:48 to 28:22. If the molar ratio of (e) is less than 0.5, the effects in improving the molding processability by taking advantage of the decrease in the melting point of polymer and further in improving the heat stability may sometimes become insufficient, and if it exceeds 30, the melting point of polymer may sometimes starts to increase again. Further, in the polyimide ester, the preferred, total molar fraction of the (c) structural units derived from carboxy-N-(carboxyphenyl)phthalimides and the (d) structural units derived from carboxy-N-(hydroxyphenyl)phthalimides is from 0.1 to 30 mol %, more preferably from 0.5 to 20 mol %. If the molar fraction is less than 0.1 mol %, the effect in improving the dimensional stability may become insufficient, and if it exceeds 30 mol %, the melting point may sometimes become high resulting in the difficulty in molding. In an example, when the total molar fraction of (c) and (d) was 40 mol %. In some experiments, polyimide esters containing 40 mol % of (c) or (d), or (c) and (d), were measured to have a temperature for flow onset of 385° C. or more.

Among various embodiments of the thermoplastic, liquid-crystalline, wholly aromatic polyimide ester of the present invention comprising the structural units (a), (e), (b), and (c) or (d) or the structural units (a), (e), (b), (c), and (d), the thermoplastic, liquid-crystalline, wholly aromatic polyimide ester comprising the structural units I, V, II, and III represented by the following formulas respectively or the structural units I, V, II, and IV represented by the following formulas respectively can be produced by using relatively low-priced compounds as the raw materials.

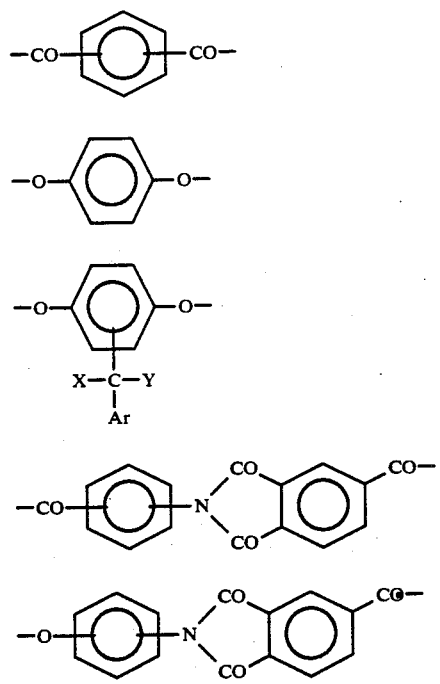

wherein
in the structural unit I, the two carbonyl groups are present at meta- or para-position to each other, the two carbonyl groups being present at para-position to each other in 90 mol % or more of the structural unit I,
in the structural unit II, each of X and Y represents independently hydrogen or an alkyl group of 1 to 3 carbon atoms, Ar represents an aryl group of 6 to 12 carbon atoms,
in the structural unit III, the carbonyl group at the left end and the imido group are present at para- or meta-position to each other,
in the structural unit IV, the oxy group at the left end and the imido group are present at para- or meta-position to each other, and
the structural units I, V, II, and III or the structural units I, V, II, and IV are bonded with one another at each end through ester bonds.

Among various embodiments of the two types of the polyimide esters according to the present invention, the preferred are those wherein the substituent group Ar in the structural unit II is phenyl group.

With respect to the structural unit III, the preferred is the one wherein the carbonyl group at the left end and the imido group are present at para-position to each other. With respect to the structural unit IV, the preferred is one wherein the oxy group at the left end and the imido group are present at para-position to each other.

The polyimide esters of the present invention may contain (h) a structural unit derived from p-hydroxybenzoic acid or a substituted p-hydroxybenzoic acid within a range of from 1 to 20 mol %.

The polyimide ester of the present invention comprising the structural units (a), (b), and (c) or (d) or the structural units (a), (b), (c), and (d) may be produced by, for example, polycondensing
(A) at least one aromatic dicarboxylic acid or a derivative thereof,
(B) at least one substituted hydroquinone having an aralkyl substituent group attached to the benzene nucleus or a derivative thereof, and at least one phthalimide compound selected from the group consisting of (C) carboxy-N-(carboxyphenyl)phthalimides and derivatives thereof and (D) carboxy-N-(hydroxyphenyl)phthalimides and derivatives thereof,
in such an amount that the molar ratio of (A+C):B is substantially 1:1 and the molar ratio of (A+B+C+D):(C+D) is from 100:0.1 to 100:30.

The polyimide ester of the present invention comprising the structural units (a), (e), (b), and (c) or (d) or the structural units (a), (e), (b), (c), and (d) may be produced by, for example, polycondensing
(A) at least one aromatic dicarboxylic acid or a derivative thereof,
(E) hydroquinone or a derivative thereof,
(B) at least one substituted hydroquinone having an aralkyl substituent group attached to the benzene nucleus or a derivative thereof, and at least one phthalimide compound selected from the group consisting of (C) carboxy-N-(carboxyphenyl)phthalimides and derivatives thereof and (D) carboxy-N-(hydroxyphenyl)phthalimides and derivatives thereof,
in such an amount that the molar ratio of (A+C):(E+B) is substantially 1:1 and the molar ratio of (A+E+B+C+D):(C+D) is from 100:0.1 to 100:30.

To perform the above-described reactions, any technique well known in the production of polyesters may be employed. For example, the following techniques may be employed.
(1) A technique wherein each of the dihydroxy compounds is used in a form of an acylated derivative thereof, and the dicarboxy compounds are used as they are. Some concrete examples of the acylated derivative to be used in this technique include diacetyl compound, dipropionyl compound, and dibutyryl compound.

(2) A technique wherein the dihydroxy compounds and the dicarboxy compounds are allowed to react in the presence of an acylating agent. The acylating agent to be used in this technique is a compound represented by the general formula $R^1COOCOR^2$ (Each of $R^1$ and $R^2$ is an alkyl group of 1 to 3 carbon atoms.).

(3) A technique wherein the dihydroxy compounds and aryl esters of the dicarboxy compounds are allowed to react.

(4) A technique wherein the dicarboxy compound and the dihydroxy compounds are allowed to react in the presence of a condensing agent, for example, an aromatic carboxylic anhydride, such as benzoic anhydride.

In any one of the above-described techniques, polycondensing catalysts may be used.

Alternatively, some embodiments of the polyimide ester of the present invention comprising the structural units (a), (b), and (c) or (d) or the structural units (a), (b), (c), and (d) may also be produced by reacting (A) at least one aromatic dicarboxylic acid or a derivative thereof, (B) at least one substituted hydroquinone having an aralkyl substituent group attached to the benzene nucleus or a derivative thereof, and at least one amic acid compound selected from the group consisting of (F) (carboxyphthal)carboxyanilides and derivatives thereof and (G) (carboxyphthal)hydroxyanilides and derivatives thereof, in such an amount that the molar ratio of (A+F):B is substantially 1:1 and the molar ratio of (A+B+F+G):(F+G) is from 100:0.1 to 100:30, so that the amic acid compound is cyclized and the compounds A and B and the amic acid compound are polycondensed.

Some embodiments of the polyimide ester of the present invention comprising the structural units (a), (e), (b), and (c) or (d) or the structural units (a), (e), (b), (c), and (d) may also be produced by reacting (A) at least one aromatic dicarboxylic acid or a derivative thereof, (E) hydroquinone or a derivative thereof, (B) at least one substituted hydroquinone having an aralkyl substituent group attached to the benzene nucleus or a derivative thereof, and at least one amic acid compound selected from the group consisting of (F) (carboxyphthal)carboxyanilides and derivatives thereof and (G) (carboxyphthal)hydroxyanilides and derivatives thereof, in such an amount that the molar ratio of (A+F):(E+B) is substantially 1:1 and the molar ratio of (A+E+B+F+G):(F+G) is from 100:0.1 to 100:30, so that the amic acid compound is cyclized and the compounds A, E, and B and the amic acid compound are polycondensed.

In these above-described methods, amic acid compounds, which are precursors of imides, are used as the reaction materials, and imide-cyclization and condensation are carried out successively in one-pot without isolating the monomers containing imido groups. In these methods, the manner of esterification of carboxylic acids with hydroxy groups is fundamentally the same as the reaction previously stated wherein monomers containing imido groups are used.

A structural unit derived from p-hydroxybenzoic acid or a substituted p-hydroxybenzoic acid may be introduced in the polyimide esters of the present invention by adding p-hydroxybenzoic acid, a substituted p-hydroxybenzoic acid, or a derivative thereof into the above-described condensation reaction. The preferred molar fraction of this structural unit is from 1 to 20 mol %.

Some examples of the aromatic dicarboxylic acid to be used as a reaction material include terephthalic acid, 4,4'-diphenyldicarboxylic acid, 2,6-naphthalenedicarboxylic acids, 1,5-naphthalenedicarboxylic acid or derivatives thereof substituted in their benzene nucleuses. Among these, the preferred is terephthalic acid.

The preferred example of the substituted hydroquinone substituted by an aralkyl group attached to the benzene nucleus is the substituted hydroquinone from which the structural unit II will be derived. Some illustrative examples of this substituted hydroquinone include benzylhydroquinone, (α-methylbenzyl)hydroquinone, (α, α-dimethylbenzyl)hydroquinone, (α-ethylbenzyl)hydroquinone, (α-butylbenzyl)hydroquinone, (4-methylbenzyl)hydroquinone, (3-methyl-α-ethylbenzyl)hydroquinone, (4-butyl-α-methyl-α-ethylbenzyl)hydroquinone, (1-naphthylmethyl)hydroquinone, and (2-naphthylmethyl)hydroquinone. Among these, the particularly preferred are those wherein Ar in the structural II is phenyl group, including benzylhydroquinone, (α-methylbenzyl)hydroquinone, and (α, α-dimethylbenzyl)hydroquinone.

These substituted hydroquinones can be synthesized by allowing hydroquinone to react with an alcohol or an unsaturated compound containing a vinyl double bond which corresponds to the substituent group, in the presence of an acidic catalyst such as phosphoric acid or sulfuric acid, in a proper solvent.

The above-described substituted hydroquinone may be further substituted on the benzene nucleus by halogen, particularly chloro or bromo group, in addition to an aralkyl group.

The polyimide esters of the present invention may further contain from 1 to 20 mol % of a structural unit derived from a substituted hydroquinone other than the structural unit II. Some examples of the structural unit derived from a substituted hydroquinone other than the structural unit II include the structural units derived from a hydroquinone substituted by an alkyl group of 1 to 10 carbon atoms, phenyl group or a halogen atom.

Some examples of the material for introducing the structural unit (h) derived from p-hydroxybenzoic acid or a substituted p-hydroxybenzoic acid include p-hydroxybenzoic acid, a substituted p-hydroxybenzoic acid or a compound obtainable by acylating or esterifying them. Among these, the preferred are p-hydroxybenzoic acid and p-acetoxybenzoic acid.

The phthalimide compound selected from the group consisting of (C) and (D) which is to be used in the present invention is an imide compound obtainable by various producing methods.

With respect to the producing method, for example, a derivative of carboxyphthalic anhydride represented by the following general formula

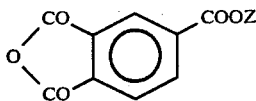

wherein Z represents hydrogen or a hydrocarbon group of 1 to 18 carbon atoms, is allowed to react with a derivative of an aromatic amino compound represented by the general formula

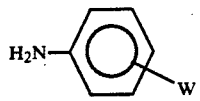

wherein W represents —OZ or —COOZ, to form an amic acid represented by the general formula

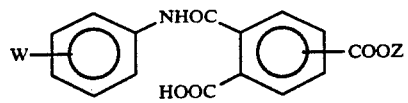

wherein Z and W are as defined above, and subsequently, the obtained amic acid is dehydrated and cyclized, to obtain an imide compound.

The above-described reaction of a derivative of carboxyphthalic anhydride with a derivative of an aromatic amino compound proceeds easily by merely making them contact each other, preferably in a form of a solution thereof, and forms an insoluble amic acid, which generally precipitates. The reaction proceeds sufficiently at room temperature, but the preferred range of the reaction temperature is from −50° C. to 100° C., and in the majority of the cases, the reaction is carried out within the range of from 0° to 80° C. The reaction completes in a short period, and generally requires no particular catalyst.

Various method may be employed for the cyclodehydration of the amic acid described above. Some examples of the methods which may be employed include (1) a method of cyclodehydration in the presence of a carboxylic anhydride, (2) a method of cyclodehydration by using an inorganic acid that has dehydrating function and a condensate thereof, (3) a method of azeotropic cyclodehydration in the presence of an acid catalyst, (4) a method of cyclodehydration by using a specific dehydration agent, and (5) a method of cyclodehydration by heating.

The polycondensation reaction using the above-described reaction materials is generally carried out at a temperature of from 20° to 400° C., preferably from 230° to 370° C., at a pressure of atmospheric pressure or lower, and in the latter half stage, it is preferable to carry out the polycondensation at a pressure of 300 to 0.01 Torr. The reaction period varies within the range of from several minutes to scores of hours depending upon the directing melt viscosity of polymer. In order to avoid the deterioration of polymers at the reaction temperature, it is preferable to limit the reaction period from several minutes to several hours.

Though the above-described reaction does not particularly require catalysts, proper copolymerization catalysts such as antimony oxide or germanium oxide may be used.

With respect to the time to add the reaction materials, all the compounds may be initially mixed to react one another, or may be individually added at various reaction stages. Thus, the composition distribution of the polyimide esters can be controlled optionally from random copolyesters to block copolyesters.

The polyimide esters of the present invention can be injection molded at a usual molding temperature (400° C. or less), and any molding method generally employed for thermoplastic resins, such as extrusion molding, compression molding or spinning can be employed. Further, the molds may be heat treated at an appropriate temperature for an appropriate period. Particularly, the polyimide ester comprising the structural units (a), (e), (b), and (c) or (d) or the structural units (a), (e), (b), (c), and (d) has a low temperature for flow onset of polymer (about 320° C. or lower), and can be molded by using a general purpose molding machine at a lower temperature.

The polyimide esters of the present invention are therefore useful as materials for accurately injection molded parts, filament, film, sheet, and the like which require dimensional stability and dimensional accuracy.

The following examples are presented as specific illustrations of the claimed invention. It should be understood, however, that the invention is not limited to the specific details set forth in the examples.

EXAMPLES 1 TO 21 AND COMPARATIVE EXAMPLES 1 TO 6

SYNTHETIC EXAMPLE 1

Synthesis of 4-carboxy-N-(4-hydroxyphenyl)phthalimide

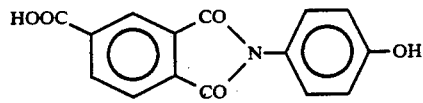

34.58 g (0.18 mol) of trimellitic anhydride and 19.64 g (0.18 mol) of p-aminophenol were dissolved in 200 ml of DMF, and the resulting solution was refluxed for 4 hours and then cooled. Upon introduction of the cooled solution into 2 l of water, light yellow crystals separated out. The crystals were filtered, washed with water, and dried. The values resulted from elementary analysis of the crystals were as follows. theoretical value (measured value) C: 63.6 (63.5), H: 3.2 (3.3), N: 4.9 (4.9)

The results show that the compound represented by the above formula was obtained.

SYNTHETIC EXAMPLE 2

Synthesis of 4-carboxy-N-(4-carboxyphenyl)phthalimide

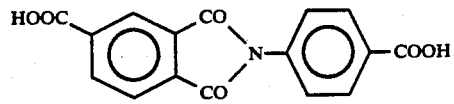

34.58 g (0.18 mol) of trimellitic anhydride and 24.69 g (0.18 mol) of p-aminobenzoic acid were dissolved in 200 ml of DMF. The resulting solution was refluxed for 4 hours and then cooled. Upon introduction of the cooled solution into 2 l of water, whitish green crystals separated out. The crystals were filtered, washed with water, and dried. The values resulted from elementary analysis of the crystals were as follows. theoretical value (measured value) C: 61.7 (61.7), H: 2.9 (2.8), N: 4.5 (4.5)

The results show that the compound represented by the above formula was obtained.

EXAMPLE 1

Into a 1.4 liter autoclave equipped with double-helical-blades placed were the following compounds.
terephthalic acid   212.6 g (1.28 mol)
(α-methylbenzyl)hydroquinone   274.3 g (1.28 mol)
4-carboxy-N-(4-hydroxyphenyl)phthalimide   7.3 g (0.0259 mol)
acetic anhydride   264.2 g (2.59 mol)

The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
|---|---|---|---|
| Calculated value (%) | 76.6 | 4.65 | 0.08 |
| Measured value (%) | 76.6 | 4.65 | 0.08 |

The results show that the obtained polyimide ester has the following structural units.

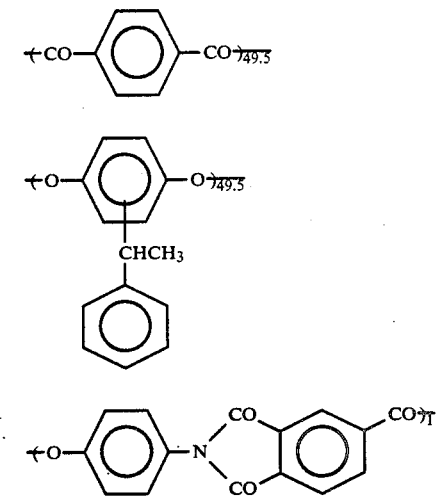

The inherent viscosity of the obtained polyimide ester was measured to be 3.5 dl/g. The polyimide ester showed optical anisotropy in its molten state at temperatures of 340° C. or more.

Measurement of the inherent viscosity was carried out by measuring the relative viscosity, $\eta_r$, using an Ubbelohde viscometer, at 30° C. and at a polymer concentration of 0.5 g/dl in a solvent mixture of p-chlorophenol/tetrachloroethane (50/50 vol %), and then estimating the value of the inherent viscosity from the following formula.

Inherent viscosity = $\ln\eta_r/0.5$ (dl/g)

Observation of the optical anisotropy was carried out by using a polarizing microscope equipped with a hot stage.

EXAMPLE 2

Into a 1.4 liter autoclave equipped with double-helical-blades placed were the following compounds.
terephthalic acid   212.6 g (1.28 mol)
(α-methylbenzyl)hydroquinone   274.3 g (1.28 mol)
4-carboxy-N-(4-hydroxyphenyl)phthalimide   22.4 g (0.0792 mol)
acetic anhydride   269.3 g (2.64 mol)

The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
|---|---|---|---|
| Calculated value (%) | 76.5 | 4.60 | 0.08 |
| Measured value (%) | 76.5 | 4.61 | 0.08 |

The infrared spectrum of the obtained polymer are shown in FIG. 1.

The results show that the obtained polyimide ester has the following structural units.

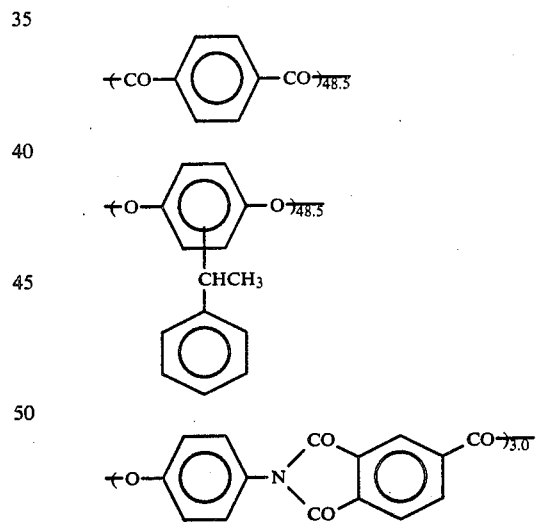

The inherent viscosity of the obtained polyimide ester was measured to be 3.2 dl/g. The polyimide ester showed optical anisotropy in its molten state at temperatures of 340° C. or more. Measurement of the inherent viscosity and observation of the optical anisotropy were carried out in the same manner as in Example 1.

EXAMPLE 3

Into a 1.4 liter autoclave equipped with double-helical-blades placed were the following compounds.
p-aminophenol   31.0 g (0.284 mol)
trimellitic anhydride   59.6 g (0.284 mol)
methyl ethyl ketone   100 ml The mixture was stirred for one hour at room temperature, and an amic acid, (4-carboxyphthal)-4-hydroxyanilide, precipitated.

Subsequently, into the autoclave added were the following compounds.

terephthalic acid 212.6 g (1.28 mol)
(α-methylbenzyl)hydroquinone 274.3 g (1.28 mol)
acetic anhydride 295.8 g (2.90 mol)

The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 20 minutes at 2 Torr.

The results of elementary analysis of the obtained polyimide ester are shown in the following table.

|  | C | H | N |
|---|---|---|---|
| Calculated value (%) | 75.4 | 4.39 | 0.77 |
| Measured value (%) | 75.4 | 4.40 | 0.76 |

The results show that the obtained polyimide ester has the following structural units.

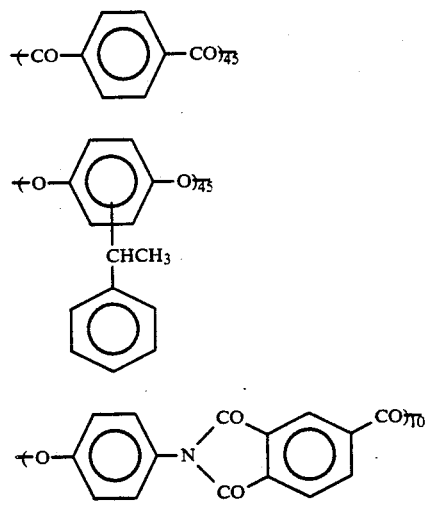

The inherent viscosity of the obtained polyimide ester was measured to be 4.3 dl/g. The polyimide ester showed optical anisotropy in its molten state at temperatures of 345° C. or more. Measurement of the inherent viscosity and observation of the optical anisotropy were carried out in the same manner as in Example 1.

EXAMPLE 4

Into a 1.4 liter autoclave equipped with double-helical-blades placed were the following compounds.
p-aminophenol 53.2 g (0.488 mol)
trimellitic anhydride 102.5 g (0.488 mol)
methyl ethyl ketone 100 ml The mixture was stirred for one hour at room temperature, and an amic acid, (4-carboxyphthal)-4-hydroxyanilide, precipitated.

Subsequently, into the autoclave added was the following compounds.

terephthalic acid 212.7 g (1.28 mol)
(α-methylbenzyl)hydroquinone 274.3 g (1.28 mol)
acetic anhydride 317.2 g (3.11 mol)

The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 15 minutes at 2 Torr.

The results of elementary analysis of the obtained polyimide ester are shown in the following table.

|  | C | H | N |
|---|---|---|---|
| Calculated value (%) | 74.7 | 4.22 | 1.20 |
| Measured value (%) | 74.7 | 4.22 | 1.20 |

The results show that the obtained polyimide ester has the following structural units.

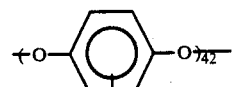

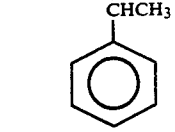

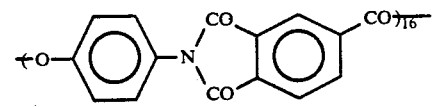

The inherent viscosity of the obtained polyimide ester was measured to be 2.7 dl/g. The polyimide ester showed optical anisotropy in its molten state at temperatures of 347° C. or more. Measurement of the inherent viscosity and observation of the optical anisotropy were carried out in the same manner as in Example 1.

EXAMPLE 5

Into a 1.4 liter autoclave equipped with double-helical-blades placed were the following compounds.
m-aminophenol 31.0 g (0.284 mol)
trimellitic anhydride 59.6 g (0.284 mol)
methyl ethyl ketone 100 ml The mixture was stirred for one hour at room temperature, and an amic acid, (4-carboxyphthal)-3-hydroxyanilide, precipitated.

Subsequently, into the autoclave added was the following compounds.

terephthalic acid 212.6 g (1.28 mol)
(α-methylbenzyl)hydroquinone 274.3 g (1.28 mol)
acetic anhydride 295.8 g (2.90 mol)

The mixture was heated to 150° C. with stirring in a nitrogen flow to distill off the methyl ethyl ketone.

After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 15 minutes at 2 Torr.

The results of elementary analysis of the obtained polyimide ester are shown in the following table.

|  | C | H | N |
|---|---|---|---|
| Calculated value (%) | 75.4 | 4.39 | 0.77 |
| Measured value (%) | 75.4 | 4.40 | 0.76 |

The results show that the obtained polyimide ester has the following structural units.

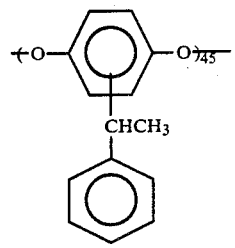

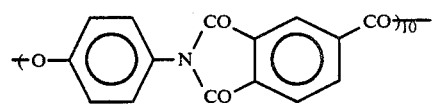

The inherent viscosity of the obtained polyimide ester was measured to be 2.6 dl/g. The polyimide ester showed optical anisotropy in its molten state at temperatures of 334° C. or more. Measurement of the inherent viscosity and observation of the optical anisotropy were carried out in the same manner as in Example 1.

EXAMPLE 6

Into a 1.4 liter autoclave equipped with double-helical-blades placed were the following compounds.
terephthalic acid    212.6 g (1.28 mol)
benzylhydroquinone    256.3 g (1.28 mol)
4-carboxy-N-(4-hydroxyphenyl)phthalimide    46.2 g (0.163 mol)
acetic anhydride    283.6 g (2.78 mol)

The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
|---|---|---|---|
| Calculated value (%) | 75.6 | 4.12 | 0.49 |
| Measured value (%) | 75.6 | 4.12 | 0.49 |

The results show that the obtained polyimide ester has the following structural units.

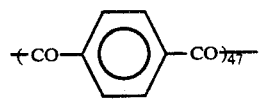

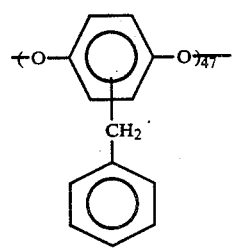

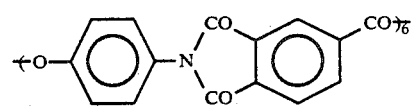

The inherent viscosity of the obtained polyimide ester was measured to be 4.3 dl/g. The polyimide ester showed optical anisotropy in its molten state at temperatures of 342° C. or more. Measurement of the inherent viscosity and observation of the optical anisotropy were carried out in the same manner as in Example 1.

EXAMPLE 7

Into a 1.4 liter autoclave equipped with double-helical-blades placed were the following compounds.
terephthalic acid    211.6 g (1.274 mol)
(α-methylbenzyl)hydroquinone    278.6 g (1.30 mol)
4-carboxy-N-(4-carboxyphenyl)phthalimide    8.1 g (0.026 mol)
acetic anhydride    270.3 g (2.65 mol)

The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
|---|---|---|---|
| Calculated value (%) | 76.6 | 4.66 | 0.08 |
| Measured value (%) | 76.6 | 4.66 | 0.08 |

The results show that the obtained polyimide ester has the following structural units.

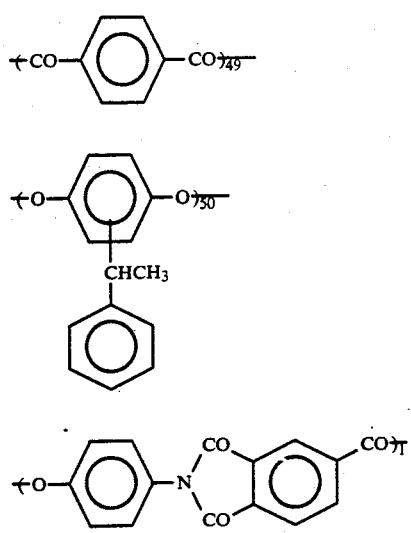

The inherent viscosity of the obtained polyimide ester was measured to be 4.3 dl/g. The polyimide ester showed optical anisotropy in its molten state at temperatures of 343° C. or more. Measurement of the inherent viscosity and observation of the optical anisotropy were carried out in the same manner as in Example 1.

EXAMPLE 8

Into a 1.4 liter autoclave equipped with double-helical-blades placed were the following compounds.
terephthalic acid 202.7 g (1.22 mol)
(α-methylbenzyl)hydroquinone 278.6 g (1.30 mol)
4-carboxy-N-(4-carboxyphenyl)phthalimide 24.3 g (0.078 mol)
acetic anhydride 270.3 g (2.65 mol)
The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
| --- | --- | --- | --- |
| Calculated value (%) | 76.5 | 4.62 | 0.24 |
| Measured value (%) | 76.5 | 4.63 | 0.25 |

The results show that the obtained polyimide ester has the following structural units.

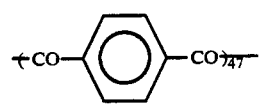

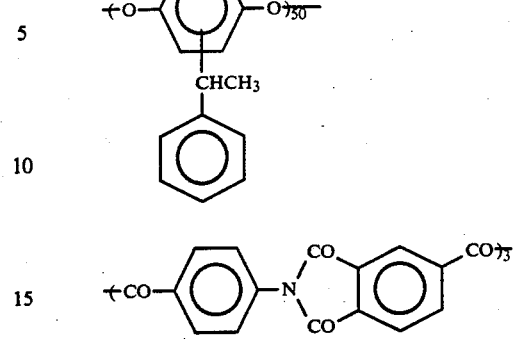

The inherent viscosity of the obtained polyimide ester was measured to be 4.3 dl/g. The polyimide ester showed optical anisotropy in its molten state at temperatures of 342° C. or more. Measurement of the inherent viscosity and observation of the optical anisotropy were carried out in the same manner as in Example 1.

EXAMPLE 9

Into a 1.4 liter autoclave equipped with double-helical-blades placed were the following compounds.
p-aminobenzoic acid 35.7 g (0.26 mol)
trimellitic anhydride 54.6 g (0.26 mol)
methyl ethyl ketone 100 ml
The mixture was stirred for one hour at room temperature, and an amic acid, (4-carboxyphthal)-4-carboxyanilide, precipitated.

Subsequently, into the autoclave added were the following compounds.
terephthalic acid 172.8 g (1.04 mol)
(α-methylbenzyl)hydroquinone 278.6 g (1.30 mol)
acetic anhydride 270.3 g (2.65 mol)
The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 20 minutes at 2 Torr.

The results of elementary analysis of the obtained polyimide ester are shown in the following table.

|  | C | H | N |
| --- | --- | --- | --- |
| Calculated value (%) | 75.9 | 4.48 | 0.75 |
| Measured value (%) | 75.9 | 4.48 | 0.75 |

The results show that the obtained polyimide ester has the following structural units.

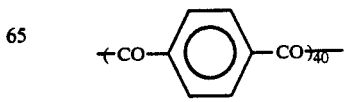

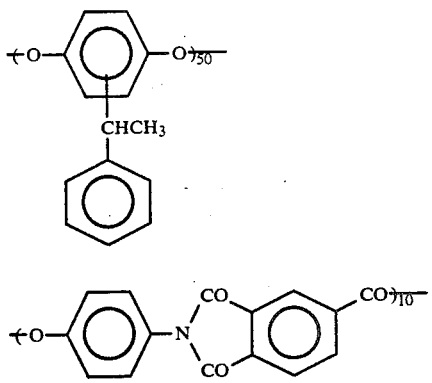

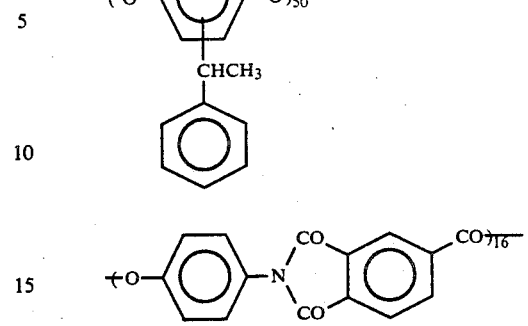

The inherent viscosity of the obtained polyimide ester was measured to be 4.3 dl./g. The polyimide ester showed optical anisotropy in its molten state at temperatures of 347° C. or more. Measurement of the inherent viscosity and observation of the optical anisotropy were carried out in the same manner as in Example 1.

EXAMPLE 10

Into a 1.4 liter autoclave equipped with double-helical-blades placed were the following compounds.
p-aminobenzoic acid   57.1 g (0.416 mol)
trimellitic anhydride   87.4 g (0.416 mol)
methyl ethyl ketone   100 ml The mixture was stirred for one hour at room temperature, and an amic acid, (4-carboxyphthal)-4-carboxyanilide, precipitated.

Subsequently, into the autoclave added were the following compounds.
terephthalic acid   146.9 g (0.884 mol)
(α-methylbenzyl)hydroquinone   189.4 g (1.30 mol)
acetic anhydride   270.3 g (2.65 mol)

The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 10 minutes at 2 Torr.

The results of elementary analysis of the obtained polyimide ester are shown in the following table.

|  | C | H | N |
|---|---|---|---|
| Calculated value (%) | 75.5 | 4.37 | 1.15 |
| Measured value (%) | 75.5 | 4.38 | 1.14 |

The results show that the obtained polyimide ester has the following structural units.

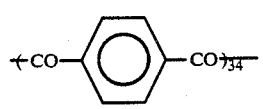

The inherent viscosity of the obtained polyimide ester was measured to be 4.6 dl/g. The polyimide ester showed optical anisotropy in its molten state at temperatures of 347° C. or more. Measurement of the inherent viscosity and observation of the optical anisotropy were carried out in the same manner as in Example 1.

EXAMPLE 11

Into a 1.4 liter autoclave equipped with double-helical-blades placed were the following compounds.
m-aminobenzoic acid   35.7 g (0.26 mol)
trimellitic anhydride   54.6 g (0.26 mol)
methyl ethyl ketone   100 ml The mixture was stirred for one hour at room temperature, and an amic acid, (4-carboxyphthal)-3-carboxyanilide, precipitated.

Subsequently, into the autoclave added were the following compounds.
terephthalic acid   172.8 g (1.04 mol)
(α-methylbenzyl)hydroquinone   278.6 g (1.30 mol)
acetic anhydride   270.3 g (2.65 mol)

The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced gradually, and the polymerization was allowed to proceed for 30 minutes at 100 Torr, and then for 20 minutes at 2 Torr.

The results of elementary analysis of the obtained polyimide ester are shown in the following table.

|  | C | H | N |
|---|---|---|---|
| Calculated value (%) | 75.9 | 4.48 | 0.75 |
| Measured value (%) | 75.9 | 4.48 | 0.75 |

The results show that the obtained polyimide ester has the following structural units.

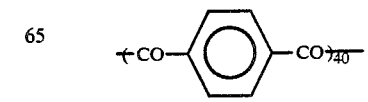

-continued

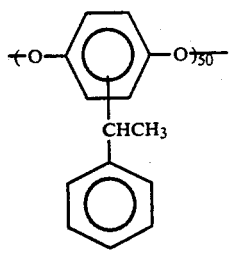

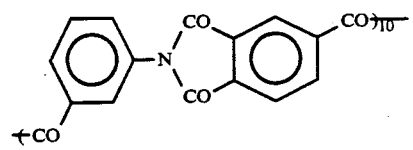

The inherent viscosity of the obtained polyimide ester was measured to be 2.8 dl/g. The polyimide ester showed optical anisotropy in its molten state at temperatures of 327° C. or more. Measurement of the inherent viscosity and observation of the optical anisotropy were carried out in the same manner as in Example 1.

EXAMPLE 12

Into a 1.4 liter autoclave equipped with double-helical-blades placed were the following compounds.
terephthalic acid   189.4 g (1.14 mol)
benzylhydroquinone   260.4 g (1.30 mol)
4-carboxy-N-(4-carboxyphenyl)phthalimide   48.6 g (0.156 mol)
acetic anhydride   270.3 g (2.65 mol)

The mixture was heated to 150° C. with stirring in a nitrogen flow, and was then refluxed for one hour. Subsequently, the reaction mixture was then heated to 350° C. in 90 minutes to distill off acetic acid. Subsequently, the pressure of the reaction system was reduced gradually, and the polymerization was allowed to proceed for 30 minutes at 100 Torr, and then for 30 minutes at 2 Torr.

The results of elementary analysis of the obtained polyimide ester are shown in the following table.

|  | C | H | N |
|---|---|---|---|
| Calculated value (%) | 75.8 | 4.16 | 0.48 |
| Measured value (%) | 75.8 | 4.16 | 0.48 |

The results show that the obtained polyimide ester has the following structural units.

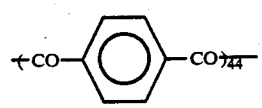

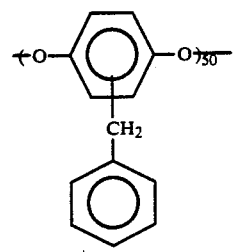

-continued

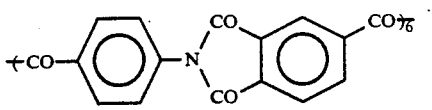

The inherent viscosity of the obtained polyimide ester was measured to be 3.7 dl/g. The polyimide ester showed optical anisotropy in its molten state at temperatures of 343° C. or more. Measurement of the inherent viscosity and observation of the optical anisotropy were carried out in the same manner as in Example 1.

COMPARATIVE EXAMPLE 1

Polymerization was carried out in the same manner as in Example 1 with the exception that the following compounds were used as the raw materials.
terephthalic acid   216.0 g (1.30 mol)
(α-methylbenzyl)hydroquinone   278.6 g (1.30 mol)
acetic anhydride   270.3 g (2.65 mol)

The obtained polymer was the homopolyester represented by the following formula.

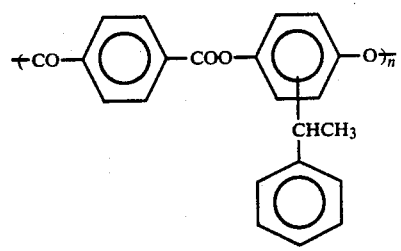

COMPARATIVE EXAMPLE 2

Polymerization was carried out in the same manner as in Example 1 with the exception that the following compounds were used as the raw materials.
terephthalic acid   216.0 g (1.30 mol)
benzylhydroquinone   260.4 g (1.30 mol)
acetic anhydride   132.6 g (1.30 mol)

The obtained polymer was the homopolyester represented by the following formula.

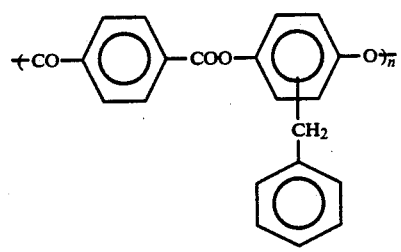

COMPARATIVE EXAMPLE 3

A commercial polyether imide (Trade name: ULTEM 1000 produced by General Electric Company) was used.

COMPARATIVE EXAMPLE 4

A commercial thermotropic, liquid-crystalline copolyester (Trade name: EKONOL E 60000 produced by Sumitomo Chemical Co., Ltd.) was used.

COMPARATIVE EXAMPLE 5

A commercial thermotropic, liquid-crystalline copolyester (Trade name: VECTRA A 950 produced by Celanese Co., Ltd.) was used.

The coefficients of linear expansion, the coefficients of mold shrinkage, the flexural properties, and the heat distortion temperatures (HDT) of the polymers obtained in Examples 1 to 12 and Comparative Examples 1 to 5 are shown in Table 1.

Measurement of these properties were conducted by using the following method.

Molding of Test Pieces

Each test piece was molded by using an injection molder (Toshiba IS 45 P) at a molding temperature of 250° to 350° C., and at a mold temperature of 120° C.

Measuring Methods

1. Coefficient of Linear Expansion

Measurement of coefficient of linear expansion was conducted in compression mode by using Seiko Thermal Analysis Apparatuses SSC-300 and TMA-100 on a test piece of approximately 10 (in measuring direction)×5×1.6 mm which was cut out from a center portion of a plate of 63.5×63.5×1.6 mm, under a load of 5 g, at a temperature raising rate of 10° C./min.

2. Coefficient of Mold Shrinkage

Coefficients of mold shrinkage of the above-described plate in MD and TD were estimated from the following formula.

Coefficient of mold shrinkage=[{(Inner size of mold cavity)−(Measured length of test piece)}/(Inner size of mold cavity)]×100(%)

3. Flexural Properties

Measurement of flexural properties was conducted on a test piece of 127×12.7×3.2 mm, at 23° C., using HTM 250 produced by Toyo Seiki Co., Ltd.

The other test conditions were accordant to ASTM-D-790.

4. Heat Distortion Temperature

Measurement of heat distortion temperature was conducted on a test piece of 127×12.7×3.2 mm, under a load of 18.6 kg/cm$^2$, using an apparatus produced by Toyo Seiki Co., Ltd.

The other test conditions were accordant to ASTM-D-648.

TABLE 1

| No. | Coefficient of linear expansion ($\times 10^{-5}$ °C$^{-1}$) MD | TD | Coefficient of mold shrinkage (%) MD | TD | Flexural strength (MPa) | Flexural modulus (GPa) | HDT (°C.) |
|---|---|---|---|---|---|---|---|
| Ex. 1 | 0.9 | 1.8 | 0.3 | 0.6 | 128 | 8 | 263 |
| Ex. 2 | 0.7 | 1.3 | 0.1 | 0.5 | 135 | 9 | 267 |
| Ex. 3 | 0.9 | 1.1 | 0.2 | 0.4 | 130 | 10 | 273 |
| Ex. 4 | 0.9 | 0.9 | 0.3 | 0.3 | 127 | 11 | 271 |
| Ex. 5 | 0.8 | 1.3 | 0.2 | 0.3 | 132 | 10 | 263 |
| Ex. 6 | 0.6 | 1.2 | 0.1 | 0.4 | 125 | 8 | 275 |
| Ex. 7 | 0.7 | 1.7 | 0.2 | 0.7 | 129 | 9 | 274 |
| Ex. 8 | 0.6 | 1.4 | 0.2 | 0.4 | 131 | 8 | 264 |
| Ex. 9 | 0.8 | 1.2 | 0.3 | 0.3 | 123 | 9 | 268 |
| Ex. 10 | 0.8 | 1.0 | 0.2 | 0.4 | 115 | 9 | 267 |
| Ex. 11 | 0.7 | 1.1 | 0.1 | 0.3 | 137 | 11 | 264 |
| Ex. 12 | 0.5 | 1.1 | 0.2 | 0.3 | 123 | 8 | 277 |
| Comp. Ex. 1 | 3.5 | 12.3 | 0.4 | 3.0 | 120 | 7 | 265 |
| Comp. Ex. 2 | 3.3 | 11.3 | 0.3 | 2.8 | 127 | 8 | 273 |
| Comp. Ex. 3 | 5.6 | 5.7 | 0.6 | 0.6 | 107 | 3.4 | 200 |
| Comp. Ex. 4 | 1.0 | 11.0 | −0.1 | 1.0 | 96 | 6.5 | 250 |
| Comp. Ex. 5 | −1.1 | 4.1 | 0.1 | 1.2 | 155 | 9.0 | 180 |

The polyimide esters of the present invention obtained in Examples 1 to 12 have small coefficients of linear expansion and small coefficients of mold shrinkage, and it indicates their excellence in dimensional stability and dimensional accuracy. Their excellence in dimensional stability and dimensional accuracy is further indicated by their small anisotropy between in MD and in TD, which is smaller than that of the conventional liquid-crystalline polymers. It is also apparent that the polyimide esters of the present invention largely excel in strength and elastic modulus. Particularly, in a case where the polyimide esters of the present invention are laminated to inorganic materials such as metal materials, glass or ceramics, or in a case where they are used for insert molding by injection molding, these excellent properties make it possible to avoid the problems that could not be solved by conventional liquid-crystalline polymers, such as peeling, bending, torsion, and increases in internal distortion and internal stress, which would be caused by the change in dimensions accompanying the change in temperature. Further, even in cases where the polyimide esters of the present invention are used alone without the other materials, they can also exhibit extremely excellent advantages in that troubles such as warping or deformation hardly occur, because, as indicated by the fact that both coefficients of linear expansion in MD and TD are close to zero, the anisotropy in linear expansion is so small as to make the anisotropy in dimension change accompanying the change in temperature small. The polyimide esters of the present invention also excel in strength and heat resistance.

EXAMPLE 13

Into a 500 ml flask equipped with crescent-stirring-blades placed were the following compounds.
p-aminophenol 0.413 g (0.00379 mol)
trimellitic anhydride 0.795 g (0.00379 mol)
methyl ethyl ketone 30 ml
The mixture was stirred for one hour at room temperature, and an amic acid, (4-carboxyphthal)-4-hydroxyanilide, precipitated.

Subsequently, into the flask added were the following compounds.
terephthalic acid 78.4 g (0.472 mol)
hydroquinone 10.2 g (0.0929 mol)
(α-methylbenzyl)hydroquinone 81.2 g (0.379 mol)
acetic anhydride 98.6 g (0.967 mol)

The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced, and the polymerization was allowed to proceed for 30 minutes at 100 Torr, and then for 20 minutes at 2 Torr.

From the results of elementary analysis, the obtained polymer was confirmed to be a polyimide ester having the following structural units.

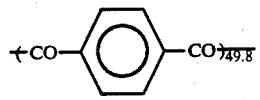

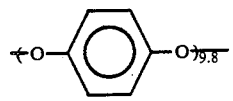

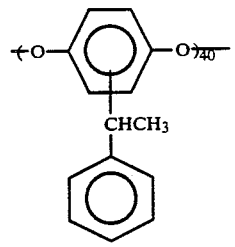

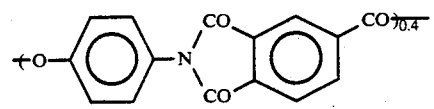

The inherent viscosity of the obtained polyimide ester was measured to be 3.2 dl/g. The polyimide ester exhibited flowability and optical anisotropy at temperatures of 311° C. or more.

Measurement of the inherent viscosity was carried out by measuring the relative viscosity $\eta_r$ using an Ubbelohde viscometer, at 30° C. and at a polymer concentration of 0.5 g/dl in a solvent mixture of p-chlorophenol/tetrachloroethane (60/40 vol %), and then estimating the value of the inherent viscosity from the following formula.

Inherent viscosity = $1n\eta_r/0.5$ (dl/g)

Observation of optical anisotropy was carried out by using a polarizing microscope equipped with a hot stage.

EXAMPLE 14

Into a 500 ml flask equipped with crescent-stirring-blades placed were the following compounds.
p-aminobenzoic acid   0.19 g (0.00867 mol)
trimellitic anhydride   0.607 g (0.00867 mol)
methyl ethyl ketone   30 ml
The mixture was stirred for one hour at room temperature, and an amic acid, (4-carboxyphthal)-4-carboxyanilide, precipitated.

Subsequently, into the flask added were the following compounds.
terephthalic acid   70.6 g (0.425 mol)
hydroquinone   19.0 g (0.173 mol)
(α-methylbenzyl)hydroquinone   55.7 g (0.26 mol)
acetic anhydride   90.1 g (0.883 mol)
The mixture was heated to 150° C. with stirring in a nitrogen flow to distill off the methyl ethyl ketone. After reflux had been carried out at this temperature for one hour, the temperature was raised to 320° C. in 90 minutes, to distill off water and acetic acid and allow dehydration and cyclization of the amic acid and polymerization to proceed. Thereafter, the pressure of the reaction system was reduced, and the polymerization was allowed to proceed for 30 minutes at 100 Torr, and then for 20 minutes at 2 Torr.

From the results of elementary analysis, the obtained polymer was confirmed to be a polyimide ester having the following structural units.

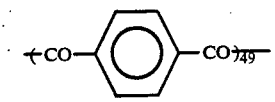

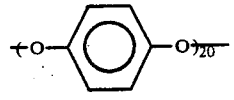

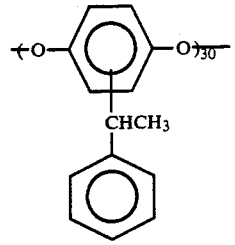

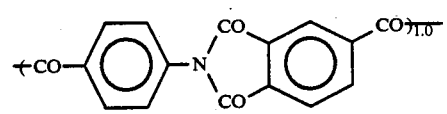

The inherent viscosity of the obtained polyimide ester was measured to be 3.5 dl/g. The polyimide ester exhibited flowability and optical anisotropy at temperatures of 312° C. or more.

EXAMPLES 16, 19, AND 20

The same procedure in Example 13 was repeated with the exception that the compositions of the charged monomers were changed.

EXAMPLES 15, 17, 18, AND 21, AND COMPARATIVE EXAMPLE 6

The same procedure in Example 14 was repeated with the exception that the compositions of the charged monomers were changed.

The comonomer compositions, the temperatures for flow onset, the temperatures for onset of mass decreasing, the heat distortion temperatures (HDT), the coefficients of linear expansion, the coefficients of mold shrinkage, and the flexural properties of the polymers obtained in Examples 13 to 21, and Comparative Examples 6 are shown in Table 2.

Measurement of these properties were conducted by using the following method.

Molding of Test Pieces

Molding was conducted in the same manner as in Examples 1 to 12.

Measuring Methods

1. Temperature for Flow Onset

The temperature for flow onset was defined as the temperature at which the melt viscosity was measured to reach $10^3$ Pa.s, at a heat up rate of 5° C./min, by using a Kōka-type Flow Tester produced by Shimadzu Corp.

2. Temperature for Onset of Mass Decreasing

The temperature for onset of mass decreasing was measured in the air according to JIS K 7210.

Measurements of the heat distortion temperature (HDT), the coefficient of linear expansion, the coefficient of mold shrinkage, and the flexural properties were conducted in the same manner as in Examples 1 to 12.

TABLE 2

| No. | Structural units (mol %) | | | | | Temp. for flow onset (°C.) | Temp. for onset of mass decreasing (°C.) | HDT (°C.) | Coefficient of linear expansion ($\times 10^{-5}$ °C$^{-1}$) | | Coefficient of mold shrinkage (%) | | Flexural properties | |
|---|---|---|---|---|---|---|---|---|---|---|---|---|---|---|
| | | | | | | | | | | | | | Flexural strength MPa | Flexural modulus GPa |
| | I | V | II | III or IV | | | | | MD | TD | MD | TD | | |
| Ex. 13 | 49.8 | 9.8 | 40 | 0.4 | (IV) | 311 | 422 | 261 | −0.8 | 2.5 | −0.1 | 0.9 | 124 | 9 |
| Ex. 14 | 49 | 20 | 30 | 1 | (III) | 312 | 425 | 262 | −0.7 | 1.5 | −0.1 | 0.7 | 127 | 9 |
| Ex. 15 | 48 | 25 | 25 | 2 | (III) | 313 | 426 | 263 | −0.5 | 1.2 | −0.1 | 0.5 | 132 | 8 |
| Ex. 16 | 48 | 18 | 30 | 4 | (IV) | 315 | 428 | 264 | −0.4 | 1.0 | −0.1 | 0.4 | 128 | 8 |
| Ex. 17 | 44 | 10 | 40 | 6 | (III) | 312 | 431 | 262 | −0.2 | 0.7 | 0.0 | 0.3 | 129 | 9 |
| Ex. 18 | 42 | 20 | 30 | 8 | (III) | 308 | 435 | 258 | −0.2 | 0.8 | 0.0 | 0.2 | 131 | 9 |
| Ex. 19 | 42 | 17 | 25 | 16 | (IV) | 307 | 439 | 257 | −0.1 | 0.6 | 0.0 | 0.2 | 133 | 11 |
| Ex. 20 | 36 | 13 | 23 | 28 | (IV) | 303 | 448 | 255 | 0.1 | 0.2 | 0.0 | 0.1 | 137 | 12 |
| Ex. 21 | 44 | 0 | 50 | 6 | (III) | 345 | 408 | 272 | −0.2 | 0.6 | 0.0 | 0.3 | 131 | 9 |
| Comp. Ex. 6 | 50 | 20 | 30 | 0 | — | 310 | 421 | 263 | −1.0 | 8 | −0.1 | 1.2 | 125 | 8 |

The Table 2 shows that the polyimide esters obtained in Examples 13 to 21 have smaller coefficients of linear expansion and smaller coefficients of mold shrinkage than the conventional polyimide esters without imido group, and therefore, excel in dimensional stability and dimensional accuracy. Also, they are further superior to the conventional liquid-crystalline polymers in their dimensional stability and dimensional accuracy because they have a smaller anisotropy in MD and TD. These facts indicate that in common with the polyimide esters of the present invention obtained in Examples 1 to 12, the polyimide esters obtained in Examples 13 to 21 are able to avoid the problems that the conventional liquid-crystalline polymers have failed to solve.

In addition, the polyimide esters obtained in Examples 13 to 20 have lower temperatures for flow onset than the polyimide ester which was obtained in Example 21 and has no unit derived from hydroquinone, and these polyimide esters are able to be melt-molded at a lower temperature and therefore, can be molded by using general purpose molding machines. Further, as indicated by the high temperatures for onset of mass decreasing, they also excel in the heat stability.

What is claimed is:

1. A thermoplastic, liquid-crystalline, wholly aromatic polyimide ester comprising
   (a) at least one structural unit derived from an aromatic dicarboxylic acid,
   (b) at least one structural unit derived from a substituted hydroquinone having an aralkyl substituent group attached to the benzene nucleus, and
   (d) at least one structural unit derived from a carboxy-N-(hydroxyphenyl)phthalimide.

2. The thermoplastic, liquid-crystalline, wholly aromatic polyimide ester as claimed in claim 1, wherein the molar fraction of the structural units (d) derived from a carboxy-N-(hydroxyphenyl)phthalimide is from 0.1 to 30 mol %.

3. The thermoplastic, liquid-crystalline, wholly aromatic polyimide ester as claimed in claim 1 or 2, which comprises the structural units I, II and IV represented by the following formulas respectively

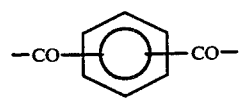
(I)

(II)

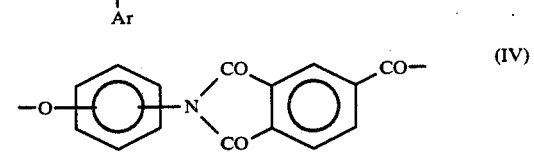
(IV)

wherein
in the structural unit I, the two carbonyl groups are present at meta- or para-position to each other, the two carbonyl groups being present at para-position to each other in 90 mol % or more of the structural unit I,
in the structural unit II, each of X and Y represents independently hydrogen or an alkyl group of 1 to 3 carbon atoms, Ar represents an aryl group of 6 to 12 carbon atoms,
in the structural unit IV, the oxy group at the left end and the imido group are present at para- or meta-position to each other, and
the structural units I, II and IV are bonded with one another at each end through ester bonds.

4. The thermoplastic, liquid-crystalline, wholly aromatic polyimide ester as claimed in claim 3, wherein in the structural unit II, Ar is phenyl group.

5. The thermoplastic, liquid-crystalline, wholly aromatic polyimide ester as claimed in claim 4, wherein in the structural unit IV, the oxy group at the left end and the imido group are present at para-position to each other.

6. The thermoplastic, liquid-crystalline, wholly aromatic polyimide ester as claimed in claim 5 consisting essentially of the structural units I, II and IV, wherein in the structural unit I, the two carbonyl groups are present at para-position to each other, and the structural unit II is represented by the following formula

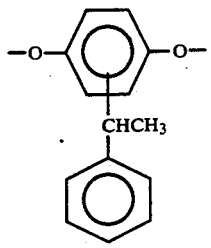

7. The thermoplastic, liquid-crystalline, wholly aromatic polyimide ester as claimed in claim 5 consisting essentially of the structural units I, II and IV, wherein in the structural unit I, the two carbonyl groups are present at para-position to each other, and the structural unit II is represented by the following formula

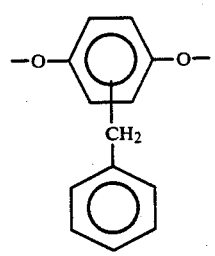

8. A method of producing a thermoplastic, liquid-crystalline, wholly aromatic polyimide ester, which method comprises polycondensing
   (A) at least one aromatic dicarboxylic acid or a derivative thereof,
   (B) at least one substituted hydroquinone having an aralkyl substituent group attached to the benzene nucleus, and
   (D) at least one phthalimide compound selected from the group consisting of a carboxy-N-(hydroxyphenyl)phthalimide and a derivative thereof,
in such an amount that the molar ratio of A:B is substantially 1:1 and the molar ratio of (A+B+D):D is from 100:0.1 to 100:30.

9. A method of producing a thermoplastic, liquid-crystalline, wholly aromatic polyimide ester, which method comprises reacting
   (A) at least one aromatic dicarboxylic acid or a derivative thereof,
   (B) at least one substituted hydroquinone having an aralkyl substituent group attached to the benzene nucleus or a derivative thereof, and
   (G) at least one amic acid compound selected form the group consisting of a (carboxyphthal)hydroxyanilide and a derivative thereof,
in such an amount that the molar ratio of A:B is substantially 1:1 and the molar ratio of (A+B+G):G is from 100:0.1 to 100:30, so that the amic acid compound is cyclized and the compounds A and B and the amic acid compound are polycondensed.

10. A thermoplastic, liquid-crystalline, wholly aromatic polyimide ester comprising
   (a) at least one structural unit derived from an aromatic dicarboxylic acid,
   (e) a structural unit derived from hydroquinone,
   (b) at least one structural unit derived from a substituted hydroquinone having an aralkyl substituent group attached to the benzene nucleus, and
   (d) at least one structural unit derived from a carboxy-N-(hydroxyphenyl)phthalimide.

11. The thermoplastic, liquid-crystalline, wholly aromatic polyimide ester as claimed in claim 10, wherein the molar ratio of the structural unit (e) derived from hydroquinone to the structural unit (b) derived from a substituted hydroquinone having an aralkyl substituent group attached to the benzene nucleus, (e):(b), is from 0.5:49.5 to 30:20, and the molar fraction of the structural unit (d) derived from a carboxy-N-(hydroxyphenyl)phthalimide is from 0.1 to 30 mol %.

12. The thermoplastic, liquid-crystalline, wholly aromatic polyimide ester as claimed in claim 10 or 11, which comprises the structural units I, V, II and IV represented by the following formulas respectively

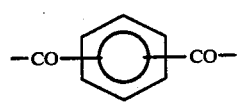  (I)

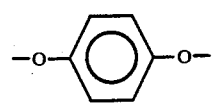  (V)

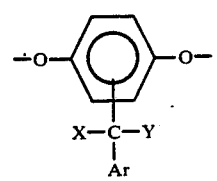  (II)

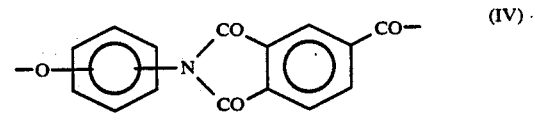  (IV)

wherein
   in the structural unit I, the two carbonyl groups are represented at meta- or para-position to each other, the two carbonyl groups being present at para-position to each other in 90 mol % or more of the structural unit I,
   in the structural unit II, each of X and Y represents independently hydrogen or an alkyl group of 1 to 3 carbon atoms, Ar represents an aryl group of 6 to 12 carbon atoms,
   in the structural unit IV, the oxy group at the left end and the imido group are present at para- or meta-position to each other, and
   the structural units I, V, II and IV are bonded with one another at each end through ester bonds.

13. The thermoplastic, liquid-crystalline, wholly aromatic polyimide ester as claimed in claim 12, wherein in the structural unit II, Ar is phenyl group.

14. The thermoplastic, liquid-crystalline, wholly aromatic polyimide ester as claimed in claim 13, wherein in the structural unit IV, the oxy group at the left end and the imido group are present at para-position to each other.

15. The thermoplastic, liquid-crystalline, wholly aromatic polyimide ester as claimed in claim 14 consisting essentially of the structural units I, V, II and IV, wherein in the structural unit I, the two carbonyl groups are present at para-position to each other, and the structural unit II is represented by the following formula

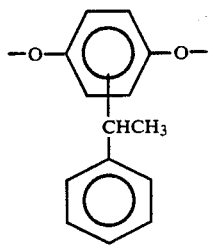

16. A method of producing a thermoplastic, liquid-crystalline, wholly aromatic polyimide ester, which method comprises polycondensing (A) at least one aromatic dicarboxylic acid or a derivative thereof,
(E) hydroquinone or a derivative thereof,
(B) at least one substituted hydroquinone having an aralkyl substituent group attached to the benzene nucleus or a derivative thereof, and
(D) at least one phthalimide compound selected from the group consisting of a carboxy-N-(hydroxyphenyl)phthalimide and a derivative thereof,
in such an amount that the molar ratio of A:(E+B) is substantially 1:1 and the molar ratio of (A+E+B+D):D is from 100:0.1 to 100:30.

17. A method of producing a thermoplastic, liquid-crystalline, wholly aromatic polyimide ester, which method comprises reacting (A) at least one aromatic dicarboxylic acid or a derivative thereof,
(E) hydroquinone or a derivative thereof,
(B) at least one substituted hydroquinone having an aralkyl substituent group attached to the benzene nucleus or a derivative thereof, and
(G) at least one amic acid compound selected form the group consisting of a (carboxyphthal)hydroxyanilide and a derivative thereof, in such an amount that the molar ratio of A:(E+B) is substantially 1:1 and the molar ratio of (A+E+B+G):G is from 100:0.1 to 100:30, so that the amic acid compound is cyclized and the compounds A, E and B and the amic acid compound are polycondensed.

* * * * *